(12) United States Patent
Milheim et al.

(10) Patent No.: US 11,005,322 B2
(45) Date of Patent: May 11, 2021

(54) ROTOR ASSEMBLIES FOR AXIAL FLUX MACHINES

(71) Applicant: E-Circuit Motors, Inc., Newton, MA (US)

(72) Inventors: George Harder Milheim, Bozeman, MT (US); Steven Robert Shaw, Bozeman, MT (US)

(73) Assignee: E-Circuit Motors, Inc., Newton, MA (US)

( * ) Notice: Subject to any disclaimer, the term of this patent is extended or adjusted under 35 U.S.C. 154(b) by 0 days.

(21) Appl. No.: 17/086,549

(22) Filed: Nov. 2, 2020

(65) Prior Publication Data

US 2021/0083537 A1    Mar. 18, 2021

Related U.S. Application Data

(63) Continuation-in-part of application No. 15/983,985, filed on May 18, 2018.

(60) Provisional application No. 62/934,059, filed on Nov. 12, 2019, provisional application No. 62/515,251, filed on Jun. 5, 2017, provisional application No. 62/515,256, filed on Jun. 5, 2017.

(51) Int. Cl.
*H02K 1/27*    (2006.01)
*H02K 15/03*    (2006.01)
*H02K 16/02*    (2006.01)

(52) U.S. Cl.
CPC ......... *H02K 1/2793* (2013.01); *H02K 1/2733* (2013.01); *H02K 15/03* (2013.01); *H02K 16/02* (2013.01)

(58) Field of Classification Search
CPC ...... H02K 1/2793; H02K 15/03; H02K 16/02; H02K 1/2733
See application file for complete search history.

(56) References Cited

U.S. PATENT DOCUMENTS 2,970,238 A    1/1961    Swiggett
3,096,455 A    7/1963    Hahn
(Continued)

FOREIGN PATENT DOCUMENTS

CN    103001426 A    3/2013
CN    202856473 U    4/2013
(Continued)

OTHER PUBLICATIONS

International Search Report and Written Opinion of International Application No. PCT/US2018/034569 dated Aug. 30, 2018.
(Continued)

*Primary Examiner* — Thomas Truong
(74) *Attorney, Agent, or Firm* — Pierce Atwood LLP

(57) ABSTRACT

A rotor assembly for an axial flux machine may include at least one magnet and first and second support structures. The first support structure may be configured to have the at least one magnet attached thereto and to provide a flux return path for the at least one magnet. The second support structure may be configured to be attached to the first support structure so as to allow torque to be transferred between the at least one magnet and the second support structure via the first support structure, and may be further configured (A) to be attached to a rotatable shaft of the axial flux machine, or (B) to function as an output or input flange of the axial flux machine.

27 Claims, 10 Drawing Sheets

(56) References Cited

U.S. PATENT DOCUMENTS

| | | |
|---|---|---|
| 4,045,696 A | 8/1977 | Lutz et al. |
| 4,115,915 A | 9/1978 | Godfrey |
| 4,658,162 A | 4/1987 | Koyama et al. |
| 4,677,332 A | 6/1987 | Heyraud |
| 4,733,115 A | 3/1988 | Barone et al. |
| 4,804,574 A | 2/1989 | Osawa et al. |
| 5,099,162 A | 3/1992 | Sawada |
| 5,126,613 A | 6/1992 | Choi |
| 5,332,460 A | 7/1994 | Hosoya |
| 5,644,183 A | 7/1997 | Van Loenen et al. |
| 5,710,476 A | 1/1998 | Ampela |
| 5,952,742 A | 9/1999 | Stoiber et al. |
| 6,628,038 B1 | 9/2003 | Shikayama et al. |
| 7,109,625 B1 | 9/2006 | Jore et al. |
| 7,112,910 B2 | 9/2006 | Lopatinsky et al. |
| 7,301,428 B2 | 11/2007 | Suzuki et al. |
| 7,415,756 B2 | 8/2008 | Ishida et al. |
| 7,523,540 B2 | 4/2009 | Morel |
| 7,750,522 B2 | 7/2010 | Gizaw et al. |
| 7,763,997 B2 | 7/2010 | Dubuc et al. |
| 7,812,697 B2 | 10/2010 | Fullerton et al. |
| 7,882,613 B2 | 2/2011 | Barthelmie et al. |
| 8,058,762 B2 | 11/2011 | Asano |
| 8,179,002 B2 | 5/2012 | Mancuso et al. |
| 8,225,497 B2 | 7/2012 | Johnson et al. |
| 8,339,019 B1 | 12/2012 | Oyague |
| 8,362,731 B2 | 1/2013 | Smith et al. |
| 8,397,369 B2 | 3/2013 | Smith et al. |
| 8,400,038 B2 | 3/2013 | Smith et al. |
| 8,558,425 B2 | 10/2013 | Stahlhut et al. |
| 8,598,761 B2 | 12/2013 | Langford et al. |
| 8,692,637 B2 | 4/2014 | Richards et al. |
| 8,716,913 B2 | 5/2014 | Kvam et al. |
| 8,723,052 B1 | 5/2014 | Sullivan et al. |
| 8,723,402 B2 | 5/2014 | Oyague |
| 8,736,133 B1 | 5/2014 | Smith et al. |
| 8,785,784 B1 | 7/2014 | Duford et al. |
| 8,816,543 B2 | 8/2014 | Kozar et al. |
| 8,823,241 B2 | 9/2014 | Jore et al. |
| 8,941,961 B2 | 1/2015 | Banerjee et al. |
| 9,013,257 B2 | 4/2015 | Steingroever |
| 9,154,024 B2 | 10/2015 | Jore et al. |
| 9,269,483 B2 | 2/2016 | Smith et al. |
| 9,479,038 B2 | 10/2016 | Smith et al. |
| 9,673,684 B2 | 6/2017 | Shaw |
| 2002/0145360 A1 | 10/2002 | Pullen |
| 2005/0067905 A1 | 3/2005 | Maney et al. |
| 2005/0194855 A1 * | 9/2005 | Hasebe ............... H02K 1/2793 310/156.43 |
| 2006/0055265 A1 | 3/2006 | Zalusky |
| 2006/0202584 A1 | 9/2006 | Jore et al. |
| 2008/0067874 A1 | 3/2008 | Tseng |
| 2008/0100166 A1 | 5/2008 | Stahlhut et al. |
| 2009/0021333 A1 | 1/2009 | Fiedler |
| 2009/0072640 A1 | 3/2009 | Tanaka |
| 2009/0072651 A1 | 3/2009 | Yan et al. |
| 2010/0000112 A1 | 1/2010 | Carow et al. |
| 2010/0123372 A1 | 5/2010 | Huang et al. |
| 2011/0024146 A1 | 2/2011 | Katou et al. |
| 2011/0241460 A1 | 10/2011 | Mebarki et al. |
| 2011/0241470 A1 | 10/2011 | Takeuchi |
| 2012/0033236 A1 | 2/2012 | Tsugimura |
| 2012/0041062 A1 | 2/2012 | Zhou et al. |
| 2012/0212080 A1 | 8/2012 | Jiang et al. |
| 2012/0217831 A1 | 8/2012 | Jore et al. |
| 2012/0262019 A1 | 10/2012 | Smith et al. |
| 2012/0262020 A1 | 10/2012 | Smith et al. |
| 2013/0049500 A1 | 2/2013 | Shan et al. |
| 2013/0052491 A1 | 2/2013 | Bull et al. |
| 2013/0053942 A1 | 2/2013 | Kamel et al. |
| 2013/0062984 A1 | 3/2013 | Tremelling |
| 2013/0072604 A1 | 3/2013 | Bowen, III et al. |
| 2013/0076192 A1 | 3/2013 | Tanimoto |
| 2013/0119802 A1 | 5/2013 | Smith et al. |
| 2013/0214631 A1 | 8/2013 | Smith et al. |
| 2013/0234566 A1 | 9/2013 | Huang et al. |
| 2014/0021968 A1 | 1/2014 | Lee |
| 2014/0021969 A1 | 1/2014 | Tseng et al. |
| 2014/0021972 A1 | 1/2014 | Barabi et al. |
| 2014/0028149 A1 | 1/2014 | Oyague |
| 2014/0042868 A1 | 2/2014 | Sullivan et al. |
| 2014/0152136 A1 | 6/2014 | Duford et al. |
| 2014/0175922 A1 | 6/2014 | Jore et al. |
| 2014/0201291 A1 | 7/2014 | Russell |
| 2014/0262499 A1 | 9/2014 | Smith et al. |
| 2014/0268460 A1 | 9/2014 | Banerjee et al. |
| 2014/0300223 A1 | 10/2014 | Yamada et al. |
| 2014/0368079 A1 | 12/2014 | Wong et al. |
| 2015/0084446 A1 | 3/2015 | Atar |
| 2015/0188375 A1 | 7/2015 | Sullivan et al. |
| 2015/0188391 A1 | 7/2015 | Carron et al. |
| 2015/0311756 A1 | 10/2015 | Sullivan |
| 2015/0318751 A1 | 11/2015 | Smith et al. |
| 2016/0247616 A1 | 8/2016 | Smith et al. |
| 2016/0285327 A1 | 9/2016 | Sasaki et al. |
| 2016/0372995 A1 | 12/2016 | Smith et al. |
| 2017/0040878 A1 | 2/2017 | Smith et al. |
| 2017/0047792 A1 | 2/2017 | Klassen et al. |

FOREIGN PATENT DOCUMENTS

| | | |
|---|---|---|
| CN | 103580412 A | 2/2014 |
| CN | 104426263 A | 3/2015 |
| CN | 104467243 A | 3/2015 |
| DE | 19954196 A1 | 6/2000 |
| EP | 0563852 A1 | 10/1993 |
| EP | 1086523 A2 | 3/2001 |
| EP | 2696481 A2 | 2/2014 |
| EP | 2882079 A2 | 6/2015 |
| EP | 3340436 A1 | 6/2018 |
| FR | 2262880 A1 | 9/1975 |
| GB | 2030790 A | 4/1980 |
| GB | 2485185 A | 5/2012 |
| JP | 5836145 A | 3/1983 |
| JP | 59213287 A | 12/1984 |
| WO | 2004073365 A2 | 8/2004 |
| WO | 2009068079 A1 | 6/2009 |
| WO | 2016186533 A1 | 11/2016 |

OTHER PUBLICATIONS

International Search Report and Written Opinion dated Feb. 15, 2021 for International Patent Application No. PCT/US2020/059305.

* cited by examiner

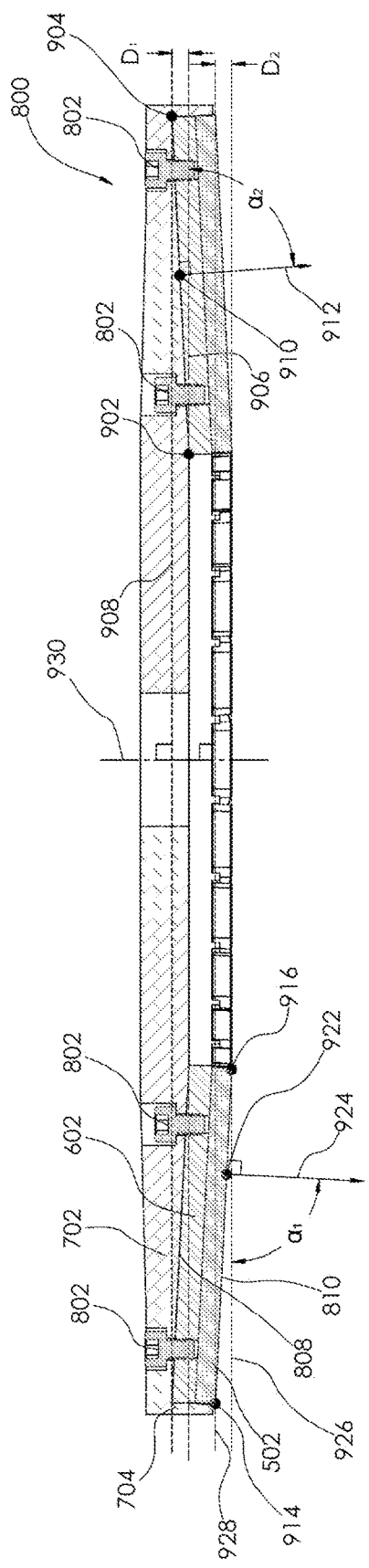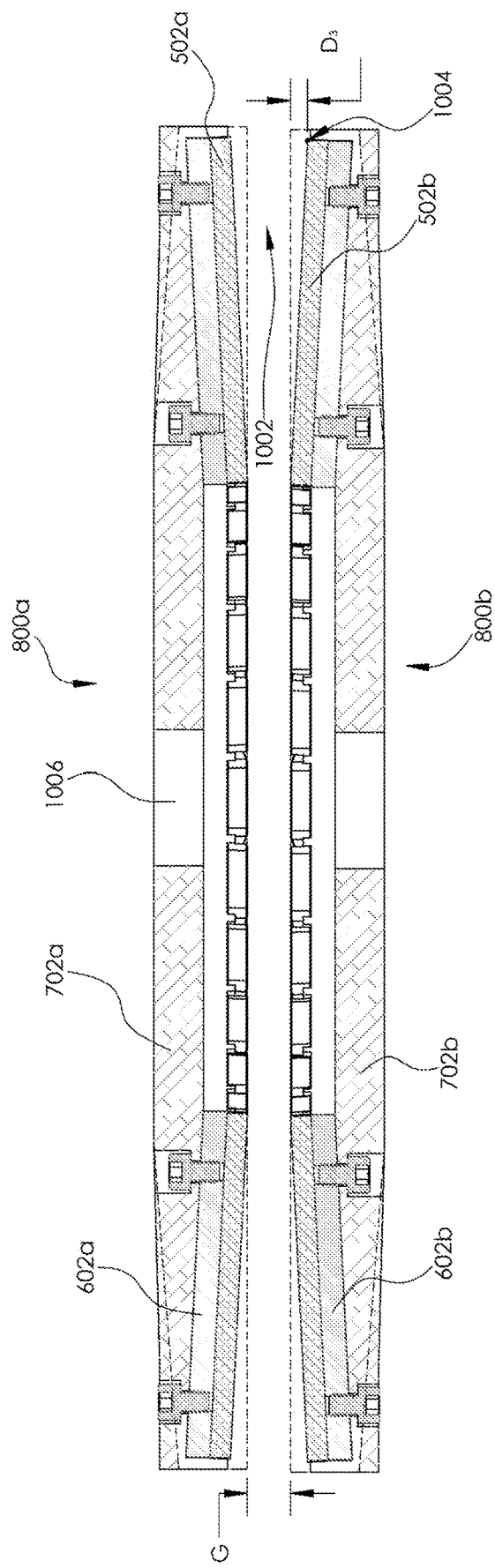
FIG. 9
FIG. 10

ROTOR ASSEMBLIES FOR AXIAL FLUX MACHINES

CROSS-REFERENCE TO RELATED APPLICATIONS

This application claims the benefit under 35 U.S.C. § 119(e) of U.S. Provisional Application No. 62/934,059, entitled IMPROVED ROTOR ASSEMBLIES FOR AXIAL FLUX MACHINES, filed Nov. 12, 2019. This application is also a continuation-in-part and claims the benefit under 35 U.S.C. § 120 to U.S. patent application Ser. No. 15/983,985, entitled PRE-WARPED ROTORS FOR CONTROL OF MAGNET-STATOR GAP IN AXIAL FLUX MACHINES, filed May 18, 2018, and published as U.S. Patent Application Pub. No. 2018/0351441, which claims the benefit under 35 U.S.C. § 119(e) to each of (1) U.S. Provisional Patent Application Ser. No. 62/515,251, entitled PRE-WARPED ROTORS FOR CONTROL OF MAGNET-STATOR GAP IN AXIAL FLUX MACHINES, filed Jun. 5, 2017, and (2) U.S. Provisional Patent Application Ser. No. 62/515,256, entitled AIR CIRCULATION IN AXIAL FLUX MACHINES, filed Jun. 5, 2017. The contents of each of the foregoing applications are incorporated herein by reference, in their entirety, for all purposes.

BACKGROUND

Permanent magnet axial flux motors and generators are known. Examples of such motors or generators (referred to herein collectively as "machines") are described in U.S. Pat. Nos. 7,109,625; 9,673,688; 9,800,109; 9,673,684; and 10,170,953, as well as U.S. Patent Application Publication No. 2018-0351441 A1 ("the '441 Publication"), the entire contents of each of which are incorporated herein by reference.

SUMMARY

In some of the disclosed embodiments, a rotor assembly for an axial flux machine comprises at least one magnet and first and second support structures. The first support structure is configured to have the at least one magnet attached thereto and to provide a flux return path for the at least one magnet. The second support structure is configured to be attached to the first support structure so as to allow torque to be transferred between the at least one magnet and the second support structure via the first support structure, wherein the second support structure is further configured (A) to be attached to a rotatable shaft of the axial flux machine, or (B) to function as an output or input flange of the axial flux machine.

In some embodiments, a method comprises attaching at least one magnet to a first support structure of a rotor assembly for an axial flux machine such that the first support structure provides a flux return path for the at least one magnet; and attaching a second support structure to the first support structure having the at least one magnet attached thereto so as to allow torque to be transferred between the at least one magnet and the second support structure via the first support structure, wherein the second support structure is further configured (A) to be attached to a rotatable shaft of the axial flux machine, or (B) to function as an output or input flange of the axial flux machine.

In some embodiments, a rotor assembly for an axial flux machine comprises at least one magnet; first means for providing a flux return path for the at least one magnet; and second means, configured to be attached to the first means, for transferring torque to or from the at least one magnet via the first means, wherein the second means is further configured (A) to be attached to a rotatable shaft of the axial flux machine, or (B) to function as an output or input flange of the axial flux machine.

BRIEF DESCRIPTION OF THE DRAWINGS

FIG. 9 shows the same rotor assembly that is shown in FIG. 8B, but with the degree of the taper exaggerated for illustrative purposes;

FIG. 10 shows a side view of a pair of pre-warped rotor assemblies, such as that shown in FIG. 9, illustrating how the rotor assemblies may bend into a desired configuration when they are incorporated into an axial flux machine;

DETAILED DESCRIPTION

Figure 1:
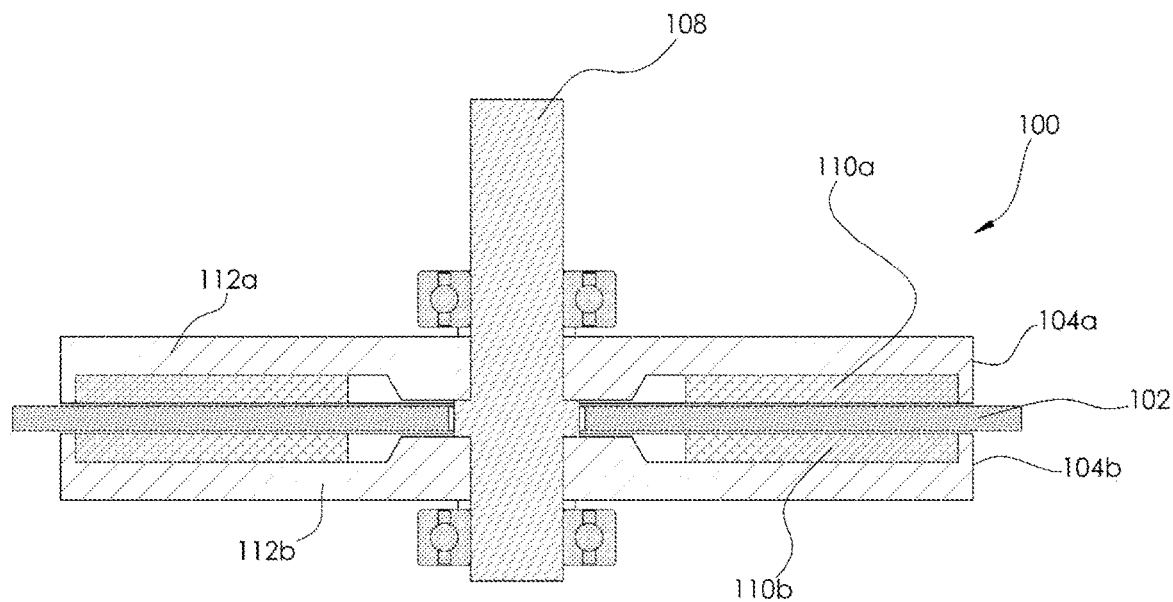
FIG. 1 shows a cross-sectional view of an overall plan of an example axial flux air-gap machine with a printed circuit board stator.

Permanent magnet axial flux motors and generators, such as those described in the above-noted patent documents, may feature a planar printed circuit board (PCB) stator assembly that is positioned between two rotor portions with permanent magnets, or between one rotor portion with one or more permanent magnets and either a moving or stationary flux return yoke that effectively present alternating north-south poles to the PCB stator. The interaction of the currents supported by the stator and the magnetic flux density established by the rotor produces torque in motor operation, or the application of torque to the rotor can induce currents in the stator in generator operation.

In describing the geometry of an axial flux machine, the terms "axially," "radially," and "angularly" are commonly used to describe the orientation of various components and/or lines of magnetic flux. As used herein, the terms "axial" and "axially" refer to a direction that is parallel to the axis of rotation of the rotor of the machine, the terms "radial" and "radially" refer to a direction that intercepts and is orthogonal to the axis of rotation of the rotor of the machine, and the terms "angular" and "angularly" refer to a direction along the curve of a circle within a plane that is orthogonal to the axis of rotation of the machine, where the center of the circle is intercepted by the axis of rotation.

For rotors below a certain size, it is practical to use a single piece of magnetic material, sometimes referred to as a "ring magnet," which has been magnetized with alternating poles. Such a ring magnet may be attached to a rotor support, sometimes referred to as a "back iron," that provides mechanical support to the magnets and a connection to the shaft of the machine.

In the '441 Publication, a method of "pre-warping" rotor components is described in which rotor supports may be machined such that the stator-facing surfaces of the permanent magnets of two respective halves of a rotor are "warped" when the rotor halves are in isolation but are "flattened" when two rotor halves are incorporated into a machine so that magnetic forces attract the rotor halves to one another and cause the structures to deflect and thus establish a uniform gap between the opposing surfaces of the permanent magnets. In all of the examples disclosed in that document, the one-piece support structures also serve to provide a flux return path.

For larger machines, particularly those with radii in excess of eight centimeters, the use of a ring magnet for the magnet structure may be impractical. Individual, or segmented, magnets for each pole can be produced and magnetized more easily and economically than a one-piece magnet. Rotor supports for segmented magnets may also include recessed features, or "pockets," that locate the individual magnets in a pattern of alternating poles. These pockets may constrain the magnets radially and axially. Fabricating pockets may involve extra machining effort as compared to a rotor support for a one-piece magnet with multiple poles. Additionally, since the rotor support typically provides a flux return path via soft magnetic materials, e.g., steel, the weight and inertia of larger rotors can be significant. Magnets can be difficult to precisely place into pockets, and, once inserted, they can be difficult to remove. This can make refitting a rotor in the event of a broken or damaged magnet difficult, and can also potentially limit the recovery and reuse of magnetic materials when a machine is removed from service.

Offered is a rotor design in which a rotor support for a portion of a rotor (e.g., a rotor half) may be made of multiple components, including at least a first support structure and a second support structure. In some implementations, segmented magnets may be located on the first support structure. The first support structure may, for example, be made of a first material, e.g., steel, that provides a flux return path for the rotor portion. This first support structure may be supported and connected to a shaft of an axial flux machine via the second support structure. In some implementations, the second support structure made of a second material which is different than the first material. The first material may be selected for its magnetic properties. The second material, on the other hand, may be selected for its stiffness, tensile strength, low weight, and/or manufacturability.

In some implementations, the first support structure may locate the magnets angularly and axially, while the second support structure may locate the magnets radially. Further, in some implementations, the first support structure may be supported by the second support structure in such a way that the first support structure can be separated from the second support structure. In some such implementations, when the first support structure is separated from the second support structure, individual magnet segments may be removed and replaced in the radial direction.

The design described herein may be particularly advantageous for larger machines (e.g., with a radius in excess of eight centimeters) using segmented magnets. However, the principles described herein may also be applicable to smaller machines using either segmented magnets or ring magnets. The design may be applied to any type of axial flux machine, including axial flux machines that employ conventional stator structures, e.g., with copper wire windings forming magnetic poles, as well as PCB-based stator structures such as those described in the above-noted patent documents.

Functions of the rotor in an axial flux machine generally include locating the magnets, providing a flux return path, and maintaining the gap to a specified design geometry.

Magnet location may involve constraining the magnets angularly so that they form an alternating series of poles that interact with the stator current density resulting in net production of torque. Further, the magnets are typically mechanically connected to the shaft so that they can transmit torque to the shaft for useful mechanical output. The magnets may also be constrained radially, to maintain the geometry of the poles. When a one-piece ring magnet is employed, the radial and angular constraint conditions may be achieved by virtue of the integrity of the ring. These constraints need to be considered explicitly, however, if the rotor is comprised of segmented magnets.

The flux return function of the rotor preferably completes the magnetic circuit between poles without allowing a significant amount of flux to "leak" outside of the intended gap. Rotor flux outside of the intended gap does not contribute to torque production/current generation, and can induce and interact with currents in conductive materials that increase drag. The flux return function is generally achieved using a soft magnetic material, such as steel.

The axial location of the magnets, or the maintenance of a gap between magnet faces, may be critical in many applications. When assembled on a shaft, the attractive force between the rotor portions (e.g., rotor halves) tends to collapse the gap between the rotor portions in which the stator is placed. Maintaining this gap at the design value may be important to motor/generator performance, and excessive reduction in gap size can result in mechanical interference between the rotor portions and the stator.

An attractive solution is to construct a rotor portion as an assembly of components, with materials optimized to the required functionality. In some implementations, one or more magnet segments may be oriented angularly on a first support structure made of a soft magnetic material, e.g., steel. The first support structure may, for example, have a disc shape. In some implementations, the first support structure may be machined from a single piece of stock. In other implementations, the first support structure may be assembled from multiple individually formed components. The first support structure, or "back-iron," may serve as a flux return path or yoke for the magnet segments. In some implementations, this piece can be made very rapidly and accurately, e.g., by water-jet, laser, or stamping processes from flat sheet stock. In part, this is possible because relatively few features are required, and little material need be removed. Minimizing the amount of soft magnetic material may avoid time and energy intensive machining processes. Minimizing soft magnetic material may be important in some circumstances, as it can reduce the machine's moment of inertia, decrease the overall mass of the machine, and/or decrease the machine's time constant.

In some implementations, the functions of locating the magnetic segments radially, mechanically coupling the magnetic components to the shaft, and maintaining the gap may be achieved with a second support structure. In some implementations, such a second support structure may be fabricated from a material (or materials) with good strength/stiffness to weight ratio. Since there is no magnetic performance requirement, a number of relatively strong/stiff materials, such as magnesium alloys, carbon fiber composites, and aluminum, are candidates for this second component. Compared to conventional machining of steel, these materials, in many cases, tend to be easier to form and machine. Further, in some implementations, such second support structures may be configured to perform additional functions, such as directly integrating components that would otherwise be mounted to external shafts. As explained in more detail below in connection with FIGS. 12A, 12B, 13 and 14, such a configuration may facilitate the design of "shaft-less" machines that can be more tightly integrated with a variety of loads or torque sources.

The first and second support structures may be fastened together in any of a number of ways to form an integrated assembly. In some implementations, for example, the first and second support structures may be fastened to one another using locating pins, adhesives, and/or fasteners. In some implementations, such a two-piece assembly may allow magnet segments to be easily manipulated and appropriately arranged for a rotor portion (e.g., a rotor half) without a jig or other mechanism to align and lower the magnet segments into their respective pockets. Because the first support structure need not constrain the magnet segment radially, before the first support structure is assembled to the second support structure, it may be possible to insert the magnet segments from the radial direction with low force, as compared to inserting magnet segments axially into a pocket. The first support structure may thus, in some implementations, serve as its own jig in aligning and maintaining clearance from adjacent magnet segments, as well as indexing the sequence of poles to the shaft so that rotor halves are aligned on final assembly. Once the magnet segments are assembled to the first support structure, the assembly including the first support structure and the magnets segments may be assembled to the second support structure, which may retain the magnet segments radially.

In some implementations, as an additional feature of a multi-piece rotor assembly as described herein, "pre-warp" may be built into the second support structure, where it may be easier to machine. The first support structure may thus be machined flat in some such implementations. When the first support structure is assembled to the second support structure, both pieces may be distorted. Overall, the assembly of the first and second support structures may approximate a frustum angled away from the gap as the radius increases. When two such rotor portions are assembled to form the gap in a rotor, the force of magnetic attraction may further distort the assembly so that the gap is substantially uniform.

Examples of advantages that may be realized with some implementations of the above approaches and techniques include the following:

1. Significant cost savings in machining operations for the multi-piece design based on the kinds of operations, materials, and clearances needed to produce the correct geometry.
2. Greatly simplified, no-jig assembly of magnets to rotor back iron.
3. Minimization of soft magnetic material mass.
4. Applicable to magnet segment and ring magnet rotor types.
5. Easier recovery of magnetic materials; extraction in the radial direction.

FIG. 1 shows a cross-sectional view of an overall plan of an example axial flux air-gap machine 100. As shown, the machine 100 may include a printed circuit board (PCB) stator 102 and a rotor that includes a pair of rotor portions 104a, 104b mechanically coupled to a shaft 108. A shown, the rotor portions 104a, 104b may each include a rotor support 112a, 112b with a respective ring magnet 110a, 110b attached thereto. In this case, each of the rotor portions 104a-b (excepting the ring magnets 110a-b) is of a one-piece conventional construction, which requires that the material selected for the rotor support 112 offer good stiffness, strength, and magnetic properties.

Figure 2:
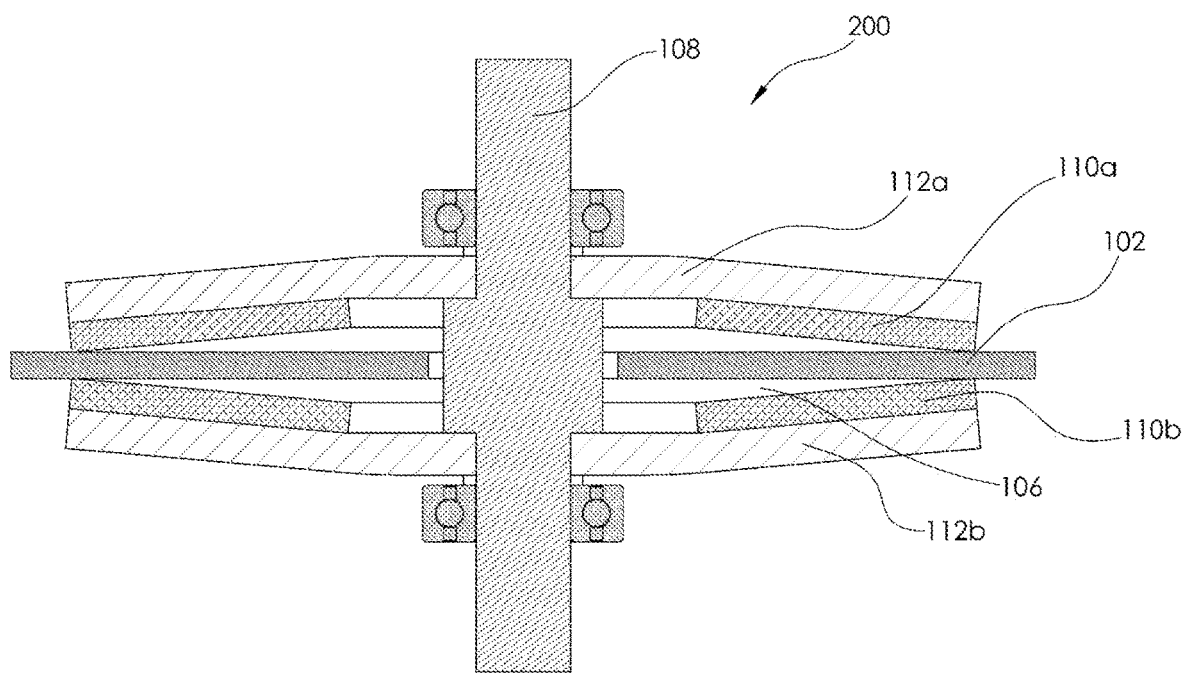
FIG. 2 shows the tendency of the air-gap in an axial flux motor to collapse due to deformation of the rotor supports, potentially causing interference with the stator.

FIG. 2 shows the tendency of an air-gap 106 in an axial flux machine 200, which is similar to the axial flux machine 100 shown in FIG. 1, to collapse due to deformation of the rotor supports 112a-b, potentially causing interference between the ring magnets 110a, 110b and the stator 102. While the illustration is exaggerated, any rotor support 112 machined to the intended equilibrium geometry will suffer some deflection.

Figure 3A:
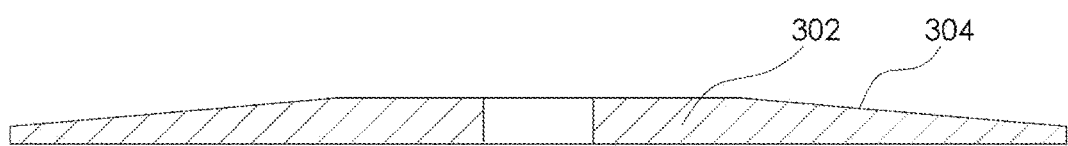
FIG. 3A shows a cross-sectional view of an example rotor support with an included taper.
Figure 3B:
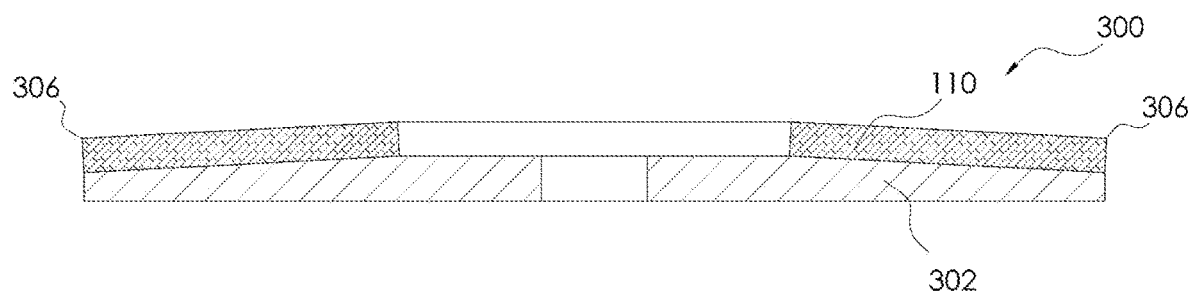
FIG. 3B shows a cross-sectional view of the example rotor support shown in FIG. 3A with a ring magnet attached to it.

FIG. 3A shows a cross-sectional view of an example rotor support 302 with an included tapered surface 304. FIG. 3B shows a rotor portion 300 (e.g., a rotor half) that includes both the rotor support 302 and a ring magnet 110 attached to the tapered surface 304. In some implementations, the rotor support 302 may be configured so that its outer edges 306 deform to the intended equilibrium rotor position with respect to the gap centerline when assembled as shown in FIG. 4.

Figure 4:
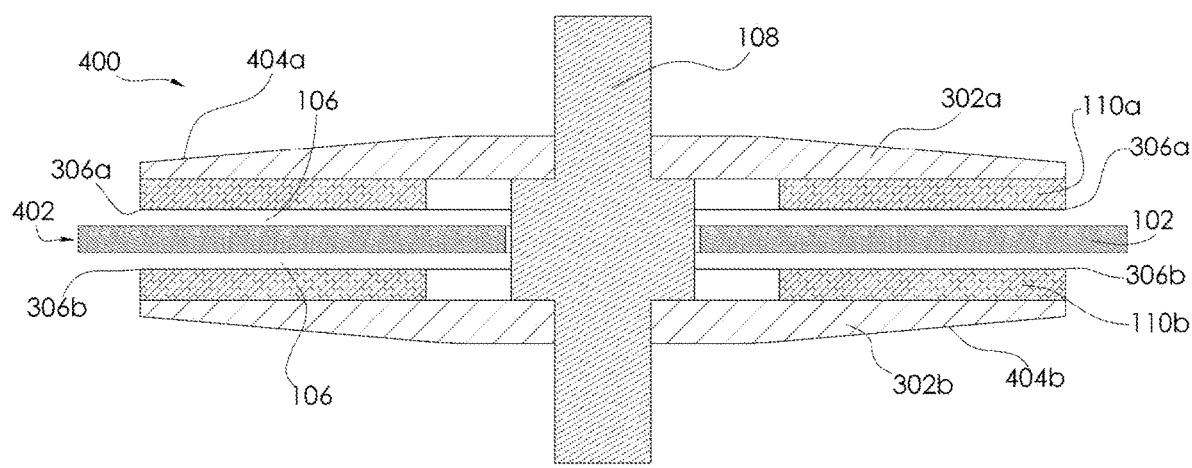
FIG. 4 shows how two rotor assemblies like that shown in FIG. 3B may be installed in an axial flux machine such that an equilibrium position of the rotor is equidistant from the gap center line.

FIG. 4 shows how two rotor portions (e.g., rotor halves), such as the rotor portion 300 shown in FIG. 3B, may be installed in an axial flux machine 400 such that an equilibrium position of the rotor is equidistant from a center line 402 of a gap 106 between the rotor portions. As illustrated, backs 404a, 404b of the rotor supports 302a, 302b are distorted, in comparison to FIG. 3B, due to the attractive force between the ring magnets 110a, 110b. Further, as also illustrated, when the rotor portions are installed in the machine 400, the outer edges 306a, 306b of the ring magnets 110a, 110b deform to the intended equilibrium rotor position with respect to the centerline 402 of the gap 106.

Figure 5:
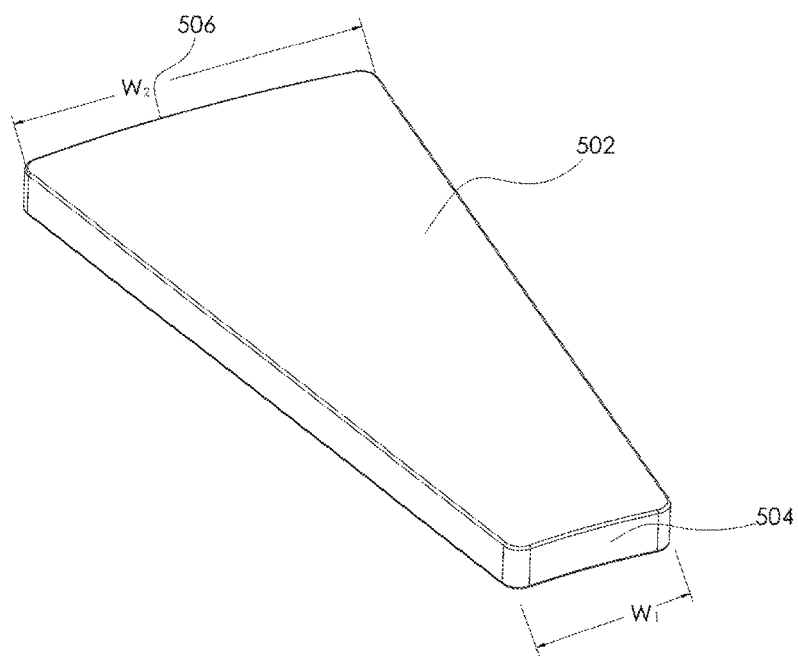
FIG. 5 shows an example magnet segment that may be used, for example, for rotor assemblies having a radius in excess of approximately four centimeters.

FIG. 5 shows a typical magnet segment 502 that may be used, for example, for rotor assemblies having a radius in excess of approximately four centimeters. Magnet segments 502 may have several radii and dimensional tolerance parameters that can make machining a pocket that constrains the segment 502 within a plane challenging. As shown, the magnet 502 may have an inner edge 504 and an outer edge 506, with the inner edge 504 having a width $W_1$ that is shorter than a width $W_2$ of the outer edge 506.

Figure 6A:
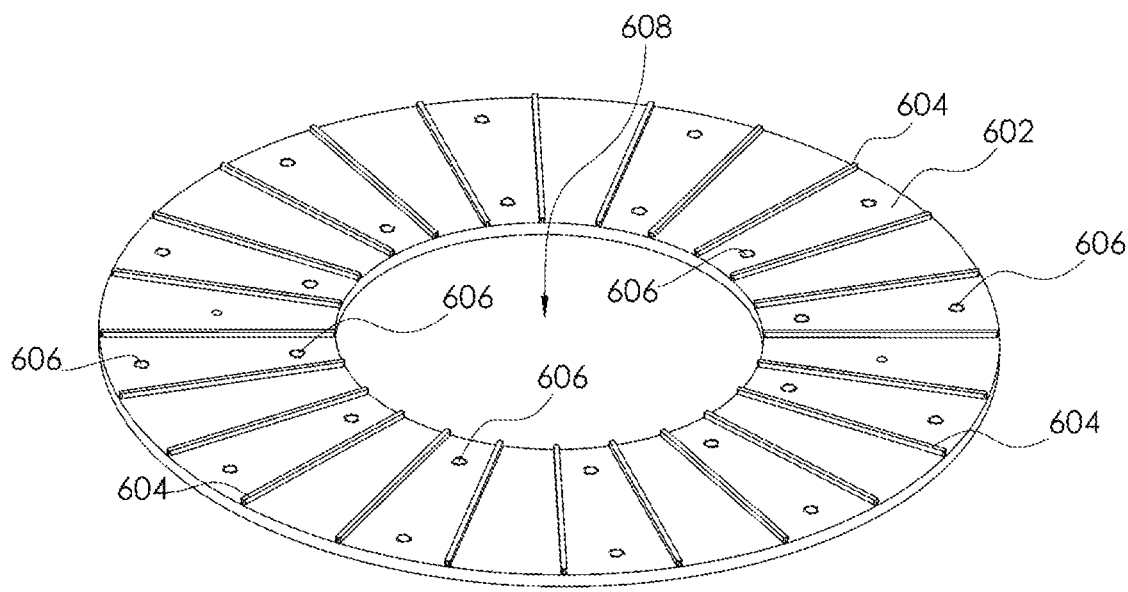
FIG. 6A shows an example of a first support structure, or "rotor back iron," of a rotor portion (e.g., a rotor half) configured in accordance with some embodiments of the present disclosure.

FIG. 6A shows an example of a first support structure 602, or "rotor back iron," of a rotor portion (e.g., a rotor half) configured in accordance with some embodiments of the present disclosure. As illustrated, in some implementations, the first support structure 602 may have an annular shape with a center opening 608, and may include locating ribs 604 to receive magnet segments, such as the magnet segment 502 shown in FIG. 5. Further, in some implementations, the first support structure 602 may include one or more pin and/or screw fastener holes 606 that can be used to secure the first support structure 602 to a second support structure 702, such as that shown in FIG. 7. In some implementations, the first support structure 602 may be made of steel.

Figure 6B:
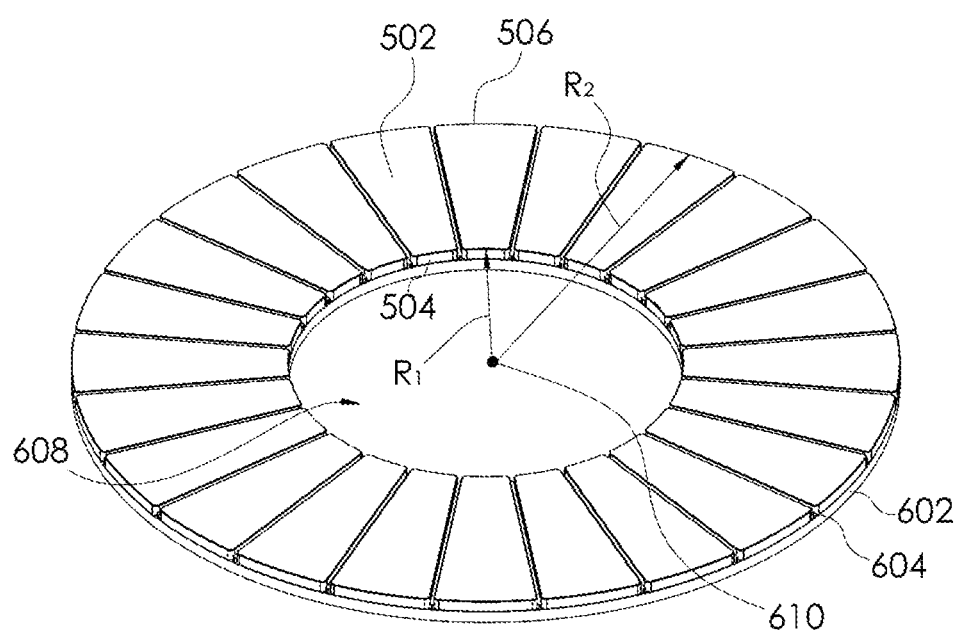
FIG. 6B shows the first support structure shown in FIG. 6A with a set of magnet segments 502 installed on it.

FIG. 6B shows how the first support structure 602 may appear when a set of magnet segments 502 have been attached to it, e.g., by sliding the magnet segments 502 between the locating ribs 604, but before the first support structure 602 is attached to the second support structure 702, as described below. As shown, the inner edges 504 of the magnet segments 502 may be positioned at a first radial distance $R_1$ from a center point 610 of the opening 608 of the first support structure 602, and the outer edges 506 of the magnet segments 502 may be positioned at a second radial distance $R_2$ from the center point 610 of the opening 608 of the first support structure 602.

Figure 7:
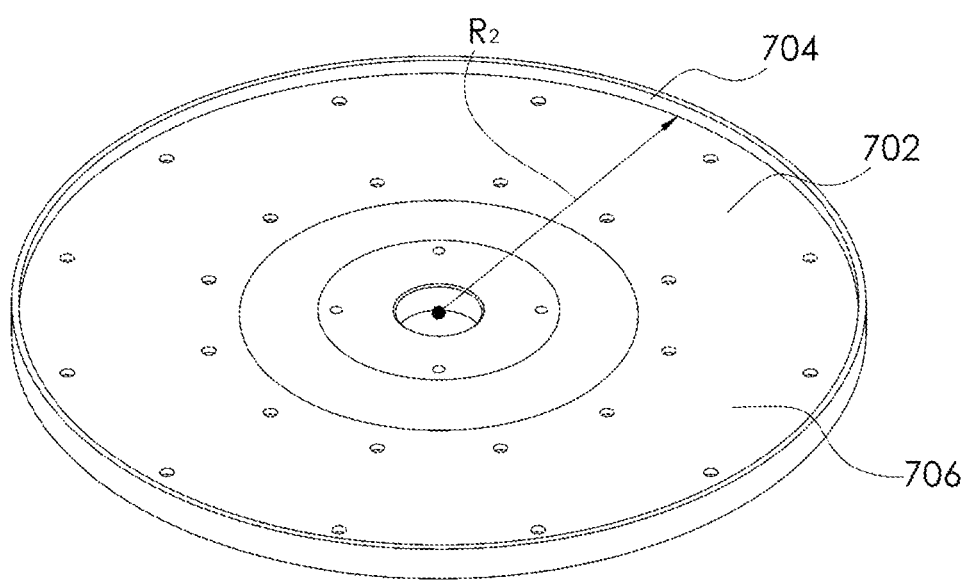
FIG. 7 shows an example of a second support structure, or "rotor support plate," configured in accordance with some embodiments of the present disclosure.
Figure 11A:
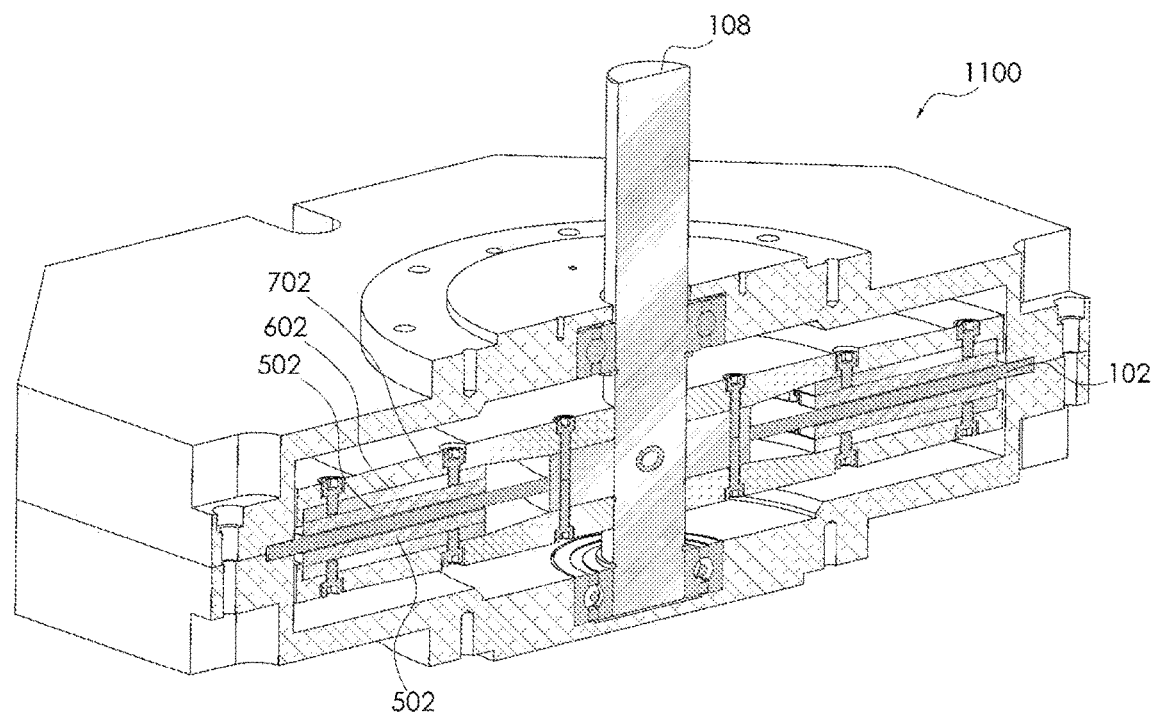
FIG. 11A shows how two rotor assemblies like that shown in FIG. 8B may be installed in an axial flux machine with a printed circuit board stator positioned within a substantially uniform gap between the faces of the magnet segments.
Figure 11B:
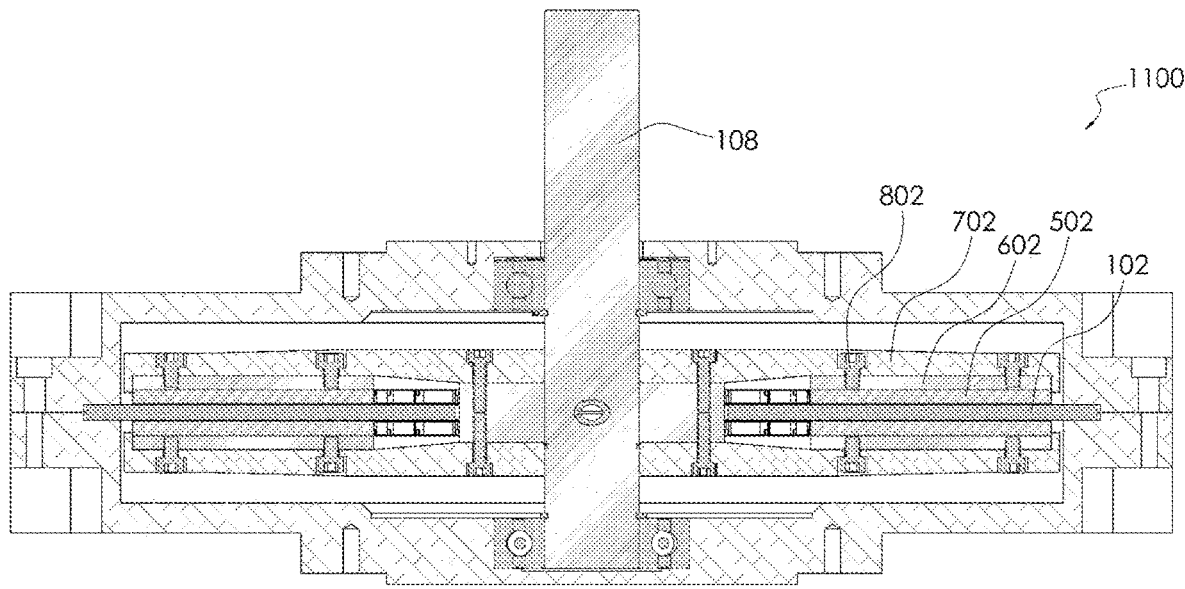
FIG. 11B shows a cross-sectional view of the assembly shown in FIG. 11A.

FIG. 7 shows an example of a second support structure 702, or "rotor support plate," configured in accordance with some embodiments of the present disclosure. As shown, in some implementations, the second support structure 702 may be configured to locate the first support structure 602 to a shaft 108 (e.g., as shown in FIGS. 11A and 11B), to constrain the magnet segments 502 radially at the second radial distance $R_2$ (e.g., via a circular lip 704), and/or to feature tapered surface regions 706 that determine how the rotor portion (e.g., rotor half) deforms on assembly. In some implementations, the second support structure 702 may be made using lathe and/or mill type operations. The second support structure 702 may, in some implementations, be made of a magnesium alloy, a carbon fiber composite, or aluminum.

Figure 8A:
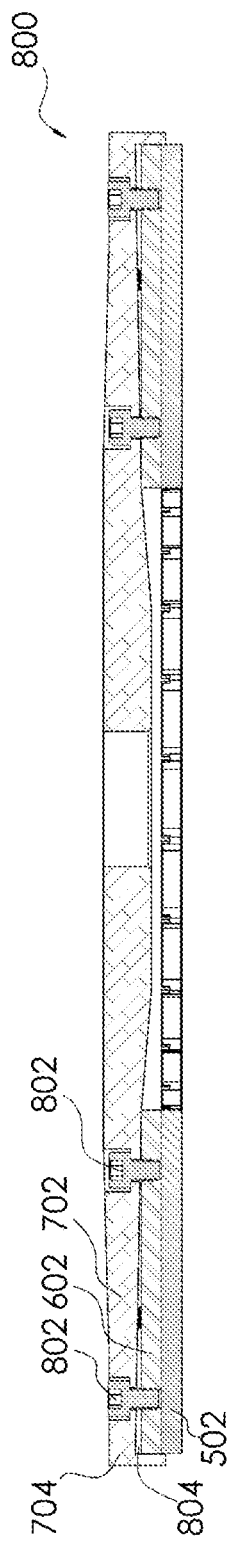
FIG. 8A shows an example rotor assembly including of a first support structure with magnet segments installed on it, such as shown in FIG. 6B, and a second support structure, such as that shown in FIG. 7, prior to applying final torque to assembly screws.

FIG. 8A shows an example rotor assembly 800 including a first support structure 602 with magnet segments installed on it, such as shown in FIG. 6B, and a second support structure 702, such as that shown in FIG. 7, prior to applying final torque to assembly screws 802. In some implementations, the configuration shown in FIG. 8A may be achieved, for example, by first positioning the magnet segments 502 between the locating ribs 604 of the first support structure 602, and subsequently positioning the first support 602 within the circular lip 704 of the second support structure 702. As FIG. 8A illustrates, before the screws 802 are tightened, a gap 804 is present between the first support structure 602 and the second support structure 702.

Figure 8B:
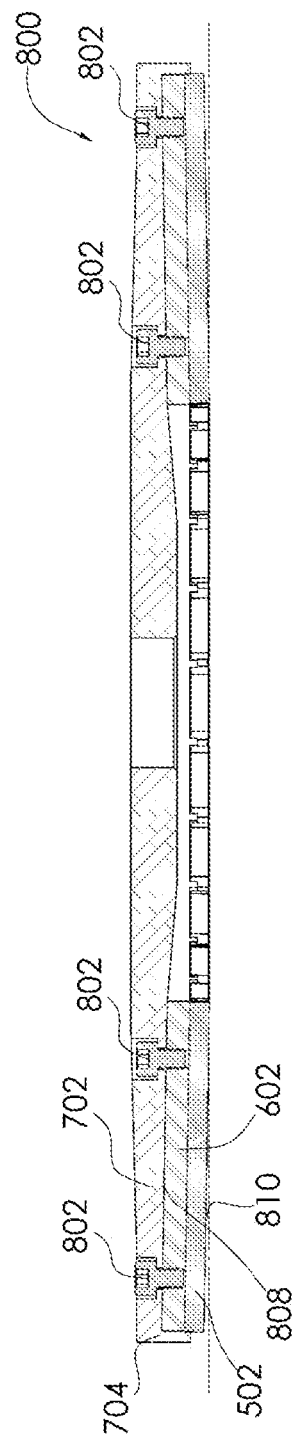
FIG. 8B shows the rotor assembly of FIG. 8A when screws have been tightened to design torque.

FIG. 8B shows the rotor assembly 800 of FIG. 8A when the screws 802 have been tightened to design torque. As shown, tightening the screws 802 may cause the first support structure 602 to conform to the second support structure 702, such that a taper 808 corresponding to the tapered surfaces 706 (shown in FIG. 7) may be transferred to the first support structure 602 and resultantly to faces 810 of the magnet segments 502.

FIG. 9 shows the same rotor assembly 800 that is shown in FIG. 8B, but with the degree of the taper 808 exaggerated for illustrative purposes. As illustrated in FIG. 9, magnet segments 502 (or alternatively a ring magnet 110) may be attached to a surface of the first support structure 602 that faces away from the second support structure 702 so that the faces 810 of the magnet segments 502 (or an annular face of a ring magnet 110) assume the shape of the taper 808.

As illustrated in FIG. 9, a degree of the taper 808 of the tapered surfaces 706 of the second support structure 702 may be measured by identifying two points 902, 904 on the surface of the second support structure 702 that contact the first support structure 602, and determining a distance $D_1$ between two planes 906, 908 to which an axis of rotation 930 of the rotor assembly 800 is normal and that intercept the first point 902 and the second point 904, respectively. In some implementations, two contact points 902, 904 can be found (aligned with the inner radius $R_1$ and the outer radius $R_2$ of a magnet segment 502, or otherwise) for which the distance $D_1$ is substantially greater than zero. The term "substantially" in this context is intended to exclude slight variations due to processing and/or material imperfections within allowable tolerances. In some implementations, the distance $D_1$ may, for example, be greater than "0.003" inches, or greater than "0.01" inches, or even greater than "0.02" inches. Additionally or alternatively, in some embodiments, two contact points 902, 904 can be found such that a ratio of the distance $D_1$ to the distance between the two points, and/or to the difference between the inner radius $R_1$ and outer radius $R_2$ of a corresponding magnet segment 502, is substantially greater than zero. In some implementations, such ratio may, for example, be greater than "0.002", or greater than "0.005", or even greater than "0.01".

As also illustrated in FIG. 9, in some implementations, at least one point 910 can be found on a surface of the second support structure 702 that contacts the first support structure 602 for which a ray 912 that extends away from and is normal to the surface (such that the ray 912 is aligned with a magnetization direction of the magnet) forms an angle $\alpha_1$ with a plane to which the axis of rotation 930 is normal that is substantially less than "90" degrees. In some implementations, the angle $\alpha_1$ may, for example, be less than "89.9" degrees, less than "89.7" degrees, or even less than "89.5" degrees. The point 910 may, for example, be aligned with the inner radius $R_1$ of a magnet segment 502, the outer radius $R_2$ of a magnet segment 502, or some point between those two radii.

Additionally or alternatively, and as also shown in FIG. 9, a degree of the taper 808 that is transferred to the faces 810 of the magnet segments 502 (or to a face of a ring magnet 110), when the first support structure 602 is attached to the second support structure 702, may be measured by identifying two points 914, 916 on a surface of a magnet segment 502 (or ring magnet 110) that is orthogonal to a magnetization direction of the magnet segment 502 (or ring magnet 110), e.g., the face 810 of the magnet segment 502 shown in FIG. 9, and determining a distance $D_2$ between two planes 926, 928 to which the axis of rotation 930 is normal and that intercept the first point 914 and the second point 916, respectively. In the example shown, the opposite surface of the magnet segment 502 that contacts the first support structure 602 is also orthogonal to the magnetization direction of the magnet segment 502. In some embodiments, two magnet surface points 914, 916 can be found (at the inner radius $R_1$ and the outer radius $R_2$ of the magnet segment 502, or elsewhere) for which the distance $D_2$ is substantially greater than zero. In some implementations, the distance $D_2$ may, for example, be greater than "0.002" inches, or greater than "0.005" inches, or even greater than "0.01" inches. Additionally or alternatively, in some embodiments, two magnet surface points 914, 916 can be found such that a ratio of the distance $D_2$ to the distance between the two points, and/or to the difference between the inner radius $R_1$ and outer radius $R_2$ of the magnet segment 502, is substantially greater than zero. In some implementations, such ratio may, for example, be greater than "0.002", or greater than "0.005", or even greater than "0.01".

As also illustrated in FIG. 9, in some implementations, at least one point 922 can be found on a surface of a magnet segment 502 that is orthogonal to a magnetization direction of the magnet segment 502 (or ring magnet 11) and faces away from the first support structure 602, e.g., the face 810 of the magnet segment 502 shown in FIG. 9, for which a ray 924 that extends away from and is normal to the magnet's surface (such that the ray 924 is aligned with a magnetization direction of the magnet segment 502) forms an angle $\alpha_2$ with a plane to which the axis of rotation 930 is normal that is substantially less than "90" degrees. In some implementations, the angle $\alpha_2$ may, for example, be less than "89.9" degrees, less than "89.7" degrees, or even less than "89.5" degrees. The point 922 may, for example, be located at the inner radius $R_1$ of a magnet segment 502, at the outer radius $R_2$ of a magnet segment 502, or at some point between those two radii. Further, as shown in FIG. 9, the first support structure 602, the second support structure 702, and the magnet segment 502 may be configured and arranged such that the ray 924 (which is normal to and extends away from the surface 810 of the magnet segment 502 that faces away from the first support structure 602) intercepts the plane 926.

As illustrated in FIG. 10, when the two rotor assemblies 800a, 800b are attached to a shaft 108 (not shown in FIG. 10) or otherwise installed in an axial flux machine, the magnetic flux of the magnet segments 502a, 502b may generate an attractive force in a gap 1002 between the magnet segments 502a, 502b that causes the rotor assemblies 800a, 800b to warp such that the ends of the rotor assemblies 800a, 800b move toward one another. The dashed lines in FIG. 10 illustrate how the rotor assemblies 800a, 800b may be shaped after they are assembled into a motor or generator, such as those described below in connection with FIGS. 11A-B, 12A-B, 13 and 14. In some implementations, the rotor assemblies 800a, 800b may be pre-warped prior to assembly such that the surfaces of two magnet segments 502a, 502b that face one another are substantially parallel in the assembled motor or generator, thus making the width of the gap 1002 substantially uniform throughout. In other implementations, the rotor assemblies 800a, 800b may be slightly "over-warped" so that, once assembled, a taper that increases as a function of radius is obtained. While this may have the undesirable effect of reducing the gap at larger radii, it may allow the use of a smaller average gap width G, thus increasing the average magnetic field strength and retaining clearance at the outer radius $R_2$ of the magnet segments 502a, 502b.

As illustrated in FIG. 10, the amount of warping the rotor assembly 800b experiences upon assembly may be measured, for example, by identifying a point 1004 located at the outer radius $R_2$ of the magnet segment 502b, and determining a distance $D_3$ that point moves in a direction coincident with the axis of rotation 930 upon assembly. The distance $D_3$ may be measured, for example, by identifying a plane that intercepts the point 1004 and to which the axis of rotation 930 is normal and determining a distance such a plane moves relative to another plane that intercepts a point 1006 at or near the center of rotor element assembly 800b and to which the axis of rotation 930 is also normal. In some implementations, the distance $D_3$ may be greater than "0.001" inches, or greater than "0.005" inches, or even greater than "0.01" inches. Additionally or alternatively, in some implementations, the ratio of the distance $D_3$ to the average width G of the gap 1002 may be greater than "0.01", or greater than "0.05", or even greater than "0.1". Additionally or alternatively, the ratio of the distance $D_3$ to an average clearance distance between the magnet segment 502b and a surface of the stator 102 (not shown in FIG. 10) may be greater than "0.25", greater than "0.5", or even greater than "1". Accordingly, in some implementations, the rotor assembly 800b may deflect as much or more than the average magnet/stator clearance distance.

Referring to FIG. 9 in conjunction with FIG. 10, it should be appreciated that, in some embodiments, the rotor assemblies 800a, 800b may be configured and arranged such that, for each rotor assemblies, one or more of the following values may decrease by fifty percent or more when the rotor assemblies 800a, 800b are installed in a motor or generator and caused to deflect as illustrated in FIG. 10: (1) the distance $D_1$ between the planes 906 and 908, (2) the ratio of the distance $D_1$ to the distance between the points 902 and 904, and/or to the difference between the inner radius $R_1$ and outer radius $R_2$ of a magnet segment 502, (3) the distance $D_2$ between planes 926 and 928, and (4) the ratio of the distance $D_2$ to the distance between the points 914 and 916, and/or to the difference between the inner radius $R_1$ and outer radius $R_2$ of a magnet segment 502.

FIG. 11A shows how two rotor assemblies, such as the rotor assembly 800 shown in FIG. 8B, may be installed in an axial flux machine 1100 with a stator 102 (e.g., a PCB-based stator) positioned within a substantially uniform gap between the faces of the magnet segments 502. FIG. 11B shows a cross-sectional view of the axial flux machine 1100 shown in FIG. 11A. The "uniform gap" configuration shown in FIGS. 11A and 11B may result because, upon installation, the attractive forces between the opposing magnet segments 502 of the two rotor assemblies 800 may cause the rotor assemblies 800 to deflect such that the first support structure 602 assumes its original, nominally flat, shape (e.g., as shown in FIG. 6A). The resulting gap between the faces of the magnet segments 502 may thus be substantially uniform as a function of radius.

Figure 12A:
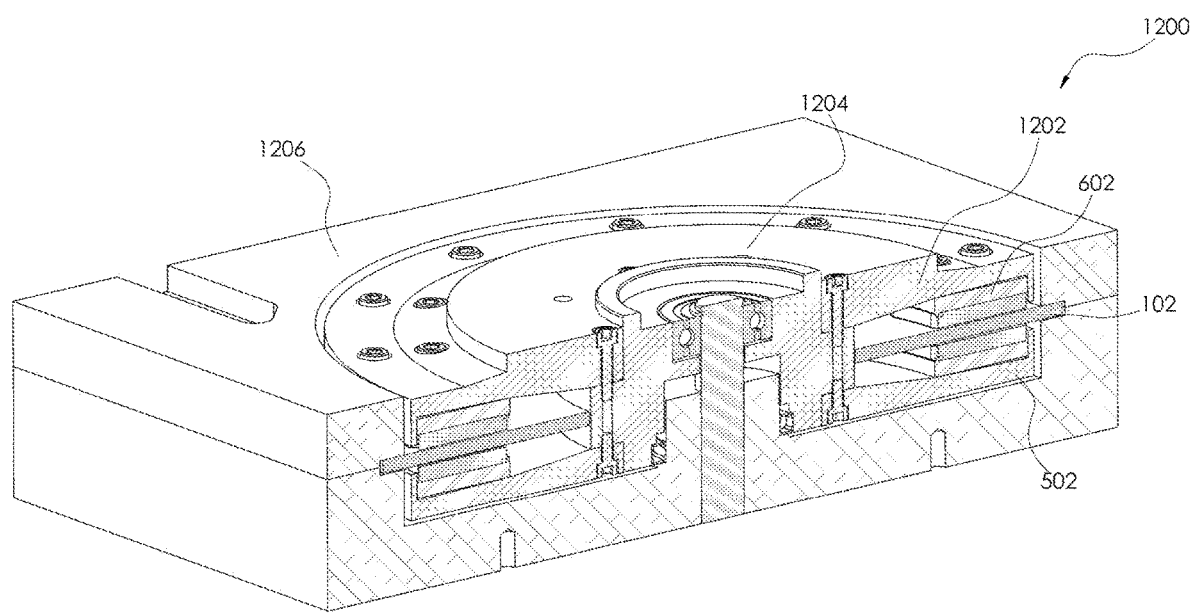
FIG. 12A shows how two rotor assemblies like that shown in FIG. 8B may be installed in an axial flux machine with a no-shaft configuration.
Figure 12B:
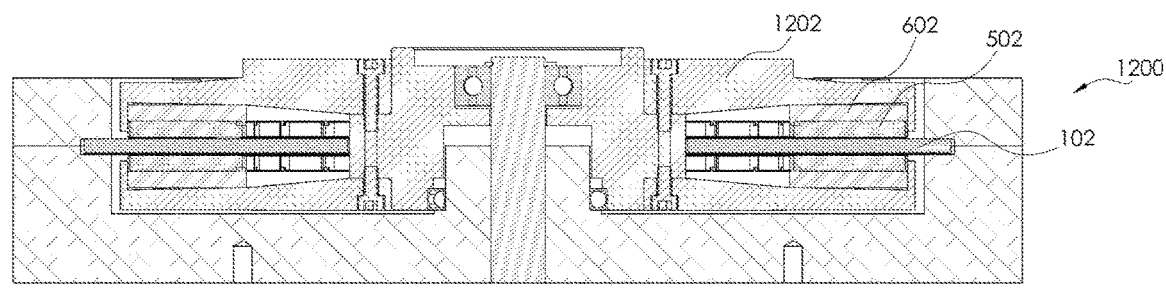
FIG. 12B shows a cross-sectional view of the assembly of FIG. 12A.

FIG. 12A shows how two rotor assemblies, such as the rotor assembly 800 shown in FIG. 8B, may be installed in an axial flux machine 1200 with a no-shaft configuration. FIG. 12B shows a cross-sectional view of the axial flux machine 1200 shown in FIG. 12A. As illustrated, in some implementations, the axial flux machine 1200 may include a second support structure 1202 that is at least partially exposed the environment external to a housing 1206, thus enabling the second support structure 1202 to also serve as a mechanical connection of the machine 1200. External components may, for example, be mounted directly to, or otherwise mechanically engaged with, an exposed portion 1204 of the second support structure 1202. In some implementations, the configuration of the first support structure 602 in the axial flux machine 1200 may be the same as or similar to the first support structure 602 in the axial flux machine 1100 described above in connection with FIGS. 11A and 11B.

Figure 13:
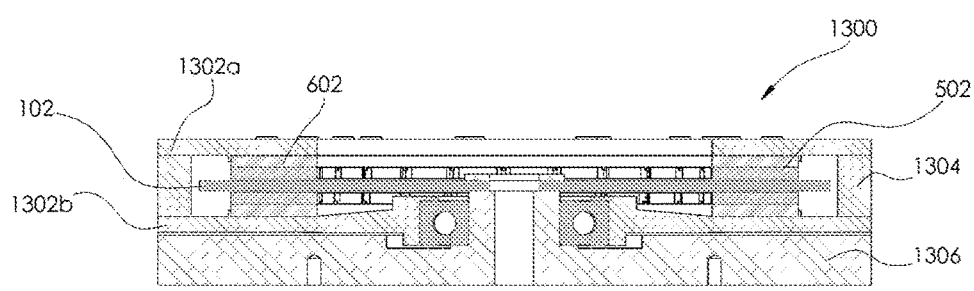
FIG. 13 shows a cross-sectional view of an example axial flux machine in an out-runner configuration in which the second support structures meet at the outside of a stator which is constructed to be mounted to a housing at its inner diameter.

FIG. 13 shows an example of a "shaft-less" axial flux machine 1300 in an "out-runner" configuration. As shown, in such a configuration, a stator 102 may be fixedly joined to a housing 1306 at an inner diameter, and two second support structures 1302a, 1302b may be fixedly joined to one another (e.g., via one or more connectors 1304) at the outside of the stator 102 and may each be rotatable relative to the housing 1306. In some implementations, the configuration of the first support structure 602 in the axial flux machine 1300 may be the same as or similar to the first support structure 602 in the axial flux machine 1100 described above in connection with FIGS. 11A and 11B.

Figure 14:
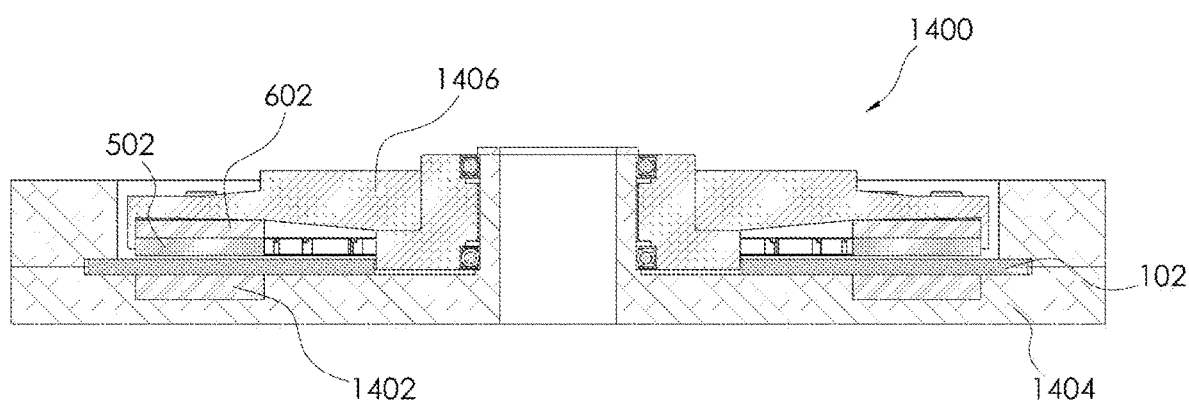
FIG. 14 shows a cross-sectional view of an example axial flux machine with a one-sided rotor.

FIG. 14 shows an example of an "shaft-less" axial flux machine 1400 with a one-sided rotor. In such a configuration, one of the two rotor halves may be replaced with a magnetic material 1402 which provides a flux return path and is fixed to a housing 1404. As illustrated, a stator 102 may be placed between the fixed magnetic material 1402 and the magnet segments 502 of a single rotor assembly, which rotor assembly includes a first support structure 602 (to which the magnet segments 502 may be mounted) and a second support structure 1406 (which may provide a mechanical connection between the magnetic elements and one or more components external to the machine 1400). In some implementations, the configuration of the first support structure 602 in the axial flux machine 1400 may be the same as or similar to the first support structure 602 in the axial flux machine 1100 described above in connection with FIGS. 11A and 11B.

Examples of Inventive Concepts/Features/Techniques

The following paragraphs describe examples of novel concepts, features and/or techniques disclosed herein.

(A1) A rotor for an axial flux motor or generator, the rotor comprising at least one magnet disposed on a first support structure made of at least one first material, wherein the first support structure provides a flux return path for the at least one magnet and is connected to a shaft via a second support structure made of at least one second material.

(A2) A rotor as described in paragraph (A1) in which the at least one magnet includes magnet segments and the first support structure provides for radial alignment of the magnet segments.

(A3) A rotor as described in paragraph (A1) or paragraph (A2) in which the at least one magnet includes magnet segments and the first support structure is configured to be detachable from the second support structure to allow the magnet segments to be removed by sliding in a radial direction.

(A4) A rotor as described in any of paragraphs (A1) through (A3) the at least one magnet includes magnet segments and in which the first support structure includes ribs that provide angular alignment of the magnet segments.

(A5) A rotor as described in any of paragraphs (A1) through (A4) in which the second support structure is configured cause an assembly including the first support structure and the at least one magnet to become pre-warped when the assembly is attached to the second support structure.

(A6) A rotor as described in any of paragraphs (A1) through (A5) in which a pre-warp feature is incorporated into the first support structure.

(A7) A rotor as described in any of paragraphs (A1) through (A6) in which the first support structure is in the shape of a disc.

(A8) A rotor as described in any of paragraphs (A1) through (A7) in which the first support structure includes multiple parts assembled to form a disc shape.

(A9) A rotor as described in any of paragraphs (A1) through (A8) in which the second support structure is configured to function as an output or input flange of the motor or generator.

(B1) A rotor for an axial flux motor or generator, the rotor comprising a ring magnet disposed on a first support structure made of at least one first material, wherein the first support structure provides a flux return path for the ring magnet and is connected to a shaft via a second support structure made of at least one second material.

(B2) A rotor as described in paragraph (B1) in which the second support structure is configured cause an assembly including the first support structure and the ring magnet to become pre-warped when the assembly is attached to the second support structure.

(B3) A rotor as described in paragraph (B1) or paragraph (B2) in which a pre-warp is incorporated into the first support structure.

(B4) A rotor as described in any of paragraphs (B1) through (B3) in which the first support structure is in the shape of a disc.

(B5) A rotor as described in any of paragraphs (B1) through (B4) in which the first support structure includes multiple parts assembled to form a disc shape.

(B6) A rotor as described in any of paragraphs (B1) through (B5) in which the second support structure is configured to function as an output or input flange of the motor or generator.

(C1) A rotor for an axial flux motor or generator, the rotor comprising at least one magnet disposed on a first support structure made of at least one first material, wherein the first support structure provides a flux return path for the at least one magnet and is attached to a second support structure made of at least one second material, the second support structure configured to provide torque to a mechanical load or receive torque from a mechanical driver.

(C2) A rotor as described in paragraph (C1) in which the at least one magnet includes magnet segments and the first support structure provides for radial alignment of the magnet segments.

(C3) A rotor as described in paragraph (C1) or paragraph (C2) in which the at least one magnet includes magnet segments and the first support structure is configured to be detachable from the second support structure to allow the magnet segments to be removed by sliding in a radial direction.

(C4) A rotor as described in any of paragraphs (C1) through (C3) the at least one magnet includes magnet segments and in which the first support structure includes ribs that provide angular alignment of the magnet segments.

(C5) A rotor as described in any of paragraphs (C1) through (C4) in which the second support structure is configured cause an assembly including the first support structure and the at least one magnet to become pre-warped when the assembly is attached to the second support structure.

(C6) A rotor as described in any of paragraphs (C1) through (C5) in which a pre-warp feature is incorporated into the first support structure.

(C7) A rotor as described in any of paragraphs (C1) through (C6) in which the first support structure is in the shape of a disc.

(C8) A rotor as described in any of paragraphs (C1) through (C7) in which the first support structure includes multiple parts assembled to form a disc shape.

(C9) A rotor as described in any of paragraphs (C1) through (C8) in which the second support structure is configured to function as an output or input flange of the motor or generator.

(D1) A rotor for an axial flux motor or generator, the rotor comprising a ring magnet disposed on a first support structure made of at least one first material, wherein the first support structure provides a flux return path for the ring magnet and is attached to a second support structure made of at least one second material, the second support structure configured to provide torque to a mechanical load or receive torque from a mechanical driver.

(D2) A rotor as described in paragraph (D1) in which the second support structure is configured cause an assembly including the first support structure and the ring magnet to become pre-warped when the assembly is attached to the second support structure.

(D3) A rotor as described in paragraph (D1) or paragraph (D2) in which a pre-warp is incorporated into the first support structure.

(D4) A rotor as described in any of paragraphs (D1) through (D3) in which the first support structure is in the shape of a disc.

(D5) A rotor as described in any of paragraphs (D1) through (D4) in which the first support structure includes multiple parts assembled to form a disc shape.

(D6) A rotor as described in any of paragraphs (D1) through (D5) in which the second support structure is configured to function as an output or input flange of the motor or generator.

(E1) A rotor assembly for an axial flux machine, comprising at least one magnet; a first support structure configured to have the at least one magnet attached thereto and to provide a flux return path for the at least one magnet; and a second support structure configured to be attached to the first support structure so as to allow torque to be transferred between the at least one magnet and the second support structure via the first support structure, wherein the second support structure is further configured (A) to be attached to a rotatable shaft of the axial flux machine, or (B) to function as an output or input flange of the axial flux machine.

(E2) A rotor assembly as described in paragraph (E1), wherein the second support structure is configured to be attached to a rotatable shaft of the axial flux machine.

(E3) A rotor assembly as described in paragraph (E1), wherein the second support structure is configured to function as an output or input flange of the axial flux machine.

(E4) A rotor assembly as described in any of paragraphs (E1) through (E3), wherein the first support structure is made of at least one first material; and the second support structure is made of at least one second material which is different than the at least one second material.

(E5) A rotor assembly as described in any of paragraphs (E1) through (E4), wherein the at least one magnet comprises magnet segments; and the second support structure is further configured to restrict radial movement of the magnet segments when the magnet segments are attached to the first support structure and the second support structure is attached to the first support structure.

(E6) A rotor assembly as described paragraph (E5), wherein the second support structure further comprises a circular lip configured to engage outermost edges of the magnet segments to restrict the radial movement of the magnet segments.

(E7) A rotor assembly as described in paragraph (E5) or paragraph (E6), wherein the first support structure is further configured to allow the magnet segments to slide radially when the second support structure is detached from the first support structure.

(E8) A rotor assembly as described in any of paragraphs (E5) through (E7), wherein the second support structure is further configured to be detachable from the first support structure to allow the magnet segments to be removed from the first support structure by sliding in a radial direction.

(E9) A rotor assembly as described in any of paragraphs (E1) through (E8), wherein the at least one magnet comprises magnet segments; and the first support structure further comprises ribs configured to restrict angular movement of the magnet segments when the magnet segments are attached to the first support structure (E10) A rotor assembly as described in any of paragraphs (E1) through (E9), wherein the second support structure further comprises at least one surface that is tapered in a radial direction so as cause the first support structure to warp to conform to a shape of the at least one surface when the second support structure is attached to the first support structure.

(E11) A rotor assembly as described in any of paragraphs (E1) through (E4), (E9), or (E10), wherein the at least one magnet comprises a ring magnet configured to be attached to the first support structure.

(E12) A rotor assembly as described in any of paragraphs (E1) through (E11), wherein the second support structure is adapted rotate about an axis of rotation of the axial flux machine; the at least one magnet has a first surface that is orthogonal to a magnetization direction of the at least one magnet and faces away from the first support structure; the first support structure, the second support structure, and the at least one magnet are configured and arranged such that, if the first support structure, the second support structure and the at least one magnet are stationary with respect to the axis of rotation and not influence by any other magnetic components, then a distance between a first plane that intercepts a first point on the first surface and to which the axis of rotation is normal and a second plane that intercepts a second point on the first surface and to which the axis of rotation is normal is substantially greater than zero; the second point is at a larger radial distance from the axis of rotation than the first point; and the first support structure, the second support structure, and the at least one magnet are further configured and arranged such that, if the first support structure, the second support structure and the at least one magnet are stationary with respect to the axis of rotation and not influence by any other magnetic components, then a ray that extends away from the first surface at the second point and is normal to the first surface intercepts the first plane.

(E13) A rotor assembly as described in paragraph (E12), wherein the at least one magnet has an inner edge disposed at the first point; the at least one magnet has an outer edge that is opposite the inner edge and disposed at the second point; and the first support structure, the second support structure and the at least one magnet are further configured and arranged such that, if the first support structure, the second support structure and the at least one magnet are stationary with respect to the axis of rotation and not influenced by any other magnetic components, then a ratio of the distance between the first and second planes and a distance between the first and second points is greater than 0.002.

(E14) A rotor assembly as described in any of paragraphs (E1) through (E13), wherein the rotor assembly is installed in the axial flux machine, and the distance between the first and second planes is substantially equal to zero.

(F1) A method, comprising attaching at least one magnet to a first support structure of a rotor assembly for an axial flux machine such that the first support structure provides a flux return path for the at least one magnet; and attaching a second support structure to the first support structure having the at least one magnet attached thereto so as to allow torque to be transferred between the at least one magnet and the second support structure via the first support structure, wherein the second support structure is further configured (A) to be attached to a rotatable shaft of the axial flux machine, or (B) to function as an output or input flange of the axial flux machine.

(F2) A method as described in paragraph (F1), wherein the second support structure is configured to be attached to a rotatable shaft of the axial flux machine.

(F3) A method as described in paragraph (F1), wherein the second support structure is configured to function as an output or input flange of the axial flux machine.

(F4) A method as described in any of paragraphs (F1) through (F3), wherein the first support structure is made of at least one first material; and the second support structure is made of at least one second material which is different than the at least one second material.

(F5) A method as described in any of paragraphs (F1) through (F4), wherein the at least one magnet comprises magnet segments, and attaching the second support structure to the first support structure further comprises attaching the second support structure to the first support structure such that the second support structure restricts radial movement of the magnet segments.

(F6) A method as described in paragraph (F5), further comprising detaching the second support structure from the first support structure to allow the magnet segments to be removed from the first support structure by sliding in a radial direction.

(F7) A method as described in any of paragraphs (F1) through (F6), wherein the second support structure further comprises at least one surface that is tapered in a radial direction; and attaching the second support structure to the first support structure further comprises attaching the second support structure to the first support structure so as to cause the first support structure to warp to conform to a shape of the at least one surface.

(F8) A method as described in any of paragraphs (F1) through (F7), wherein the second support structure is adapted rotate about an axis of rotation of the axial flux machine; the at least one magnet has a first surface that is orthogonal to a magnetization direction of the at least one magnet and faces away from the first support structure; the first support structure, the second support structure, and the at least one magnet are configured and arranged such that, if the first support structure, the second support structure and the at least one magnet are stationary with respect to the axis of rotation and not influence by any other magnetic components, then a distance between a first plane that intercepts a first point on the first surface and to which the axis of rotation is normal and a second plane that intercepts a second point on the first surface and to which the axis of rotation is normal is substantially greater than zero; the second point is at a larger radial distance from the axis of rotation than the first point; and the first support structure, the second support structure, and the at least one magnet are further configured and arranged such that, if the first support structure, the second support structure and the at least one magnet are stationary with respect to the axis of rotation and not influence by any other magnetic components, then a ray that extends away from the first surface at the second point and is normal to the first surface intercepts the first plane.

(F9) A method as described in paragraph (F8), wherein the at least one magnet has an inner edge disposed at the first point; the at least one magnet has an outer edge that is opposite the inner edge and disposed at the second point; and the first support structure, the second support structure and the at least one magnet are further configured and arranged such that, if the first support structure, the second support structure and the at least one magnet are stationary with respect to the axis of rotation and not influenced by any other magnetic components, then a ratio of the distance between the first and second planes and a distance between the first and second points is greater than 0.002.

(F10) A method as described in any of paragraphs (F1) through (F9), further comprising installing the rotor assembly in the axial flux machine such that the distance between the first and second planes becomes substantially equal to zero.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A rotor assembly for an axial flux machine, comprising:
   at least one magnet;
   a first support structure configured to have the at least one magnet attached thereto and to provide a flux return path for the at least one magnet; and
   a second support structure configured to be attached to the first support structure so as to allow torque to be transferred between the at least one magnet and the second support structure via the first support structure, wherein:
      the second support structure is further configured (A) to be attached to a rotatable shaft of the axial flux machine, or (B) to function as an output or input flange of the axial flux machine,
      the second support structure is adapted to rotate about an axis of rotation of the axial flux machine,
      the at least one magnet has a first surface that is orthogonal to a magnetization direction of the at least one magnet and faces away from the first support structure,
      the first support structure, the second support structure, and the at least one magnet are configured and arranged such that, if the first support structure, the second support structure and the at least one magnet are stationary with respect to the axis of rotation and not influenced by any other magnetic components, then a distance between a first plane that intercepts a first point on the first surface and to which the axis of rotation is normal and a second plane that intercepts a second point on the first surface and to which the axis of rotation is normal is substantially greater than zero,
      the second point is at a larger radial distance from the axis of rotation than the first point, and
      the first support structure, the second support structure, and the at least one magnet are further configured and arranged such that, if the first support structure, the second support structure and the at least one magnet are stationary with respect to the axis of rotation and not influenced by any other magnetic components, then a ray that extends away from the first surface at the second point and is normal to the first surface intercepts the first plane.

2. The rotor assembly of claim 1, wherein:
   the at least one magnet has an inner edge disposed at the first point;
   the at least one magnet has an outer edge that is opposite the inner edge and disposed at the second point; and
   the first support structure, the second support structure and the at least one magnet are further configured and arranged such that, if the first support structure, the second support structure and the at least one magnet are stationary with respect to the axis of rotation and not influenced by any other magnetic components, then a ratio of the distance between the first and second planes and a distance between the first and second points is greater than 0.002.

3. The rotor assembly of claim 1, wherein the rotor assembly is installed in the axial flux machine, and the distance between the first and second planes is substantially equal to zero.

4. The rotor assembly of claim 1, wherein the second support structure is configured to be attached to a rotatable shaft of the axial flux machine.

5. The rotor assembly of claim 1, wherein the second support structure is configured to function as an output or input flange of the axial flux machine.

6. The rotor assembly of claim 1, wherein:
   the first support structure is made of at least one first material; and
   the second support structure is made of at least one second material which is different than the at least one first material.

7. The rotor assembly of claim 1, wherein:
   the at least one magnet comprises magnet segments; and
   the second support structure is further configured to restrict radial movement of the magnet segments when the magnet segments are attached to the first support structure and the second support structure is attached to the first support structure.

8. The rotor assembly of claim 7, wherein:
   the second support structure further comprises a circular lip configured to engage outermost edges of the magnet segments to restrict the radial movement of the magnet segments.

9. The rotor assembly of claim 7, wherein:
   the first support structure is further configured to allow the magnet segments to slide radially when the second support structure is detached from the first support structure.

10. The rotor assembly of claim 9, wherein:
    the second support structure is further configured to be detachable from the first support structure to allow the magnet segments to be removed from the first support structure by sliding in a radial direction.

11. The rotor assembly of claim 1, wherein:
    the at least one magnet comprises magnet segments; and
    the first support structure further comprises ribs configured to restrict angular movement of the magnet segments when the magnet segments are attached to the first support structure.

12. The rotor assembly of claim 1, wherein:
    the at least one magnet comprises a ring magnet configured to be attached to the first support structure.

13. A rotor assembly for an axial flux machine, comprising:
    at least one magnet;
    a first support structure configured to have the at least one magnet attached thereto and to provide a flux return path for the at least one magnet; and
    a second support structure configured to be attached to the first support structure so as to allow torque to be transferred between the at least one magnet and the second support structure via the first support structure, wherein:
       the second support structure is further configured (A) to be attached to a rotatable shaft of the axial flux machine, or (B) to function as an output or input flange of the axial flux machine, and
       the second support structure further comprises at least one surface that is tapered in a radial direction so as cause the first support structure to warp to conform to a shape of the at least one surface when the second support structure is attached to the first support structure.

14. The rotor assembly of claim 13, wherein the second support structure is configured to be attached to a rotatable shaft of the axial flux machine.

15. The rotor assembly of claim 13, wherein the second support structure is configured to function as an output or input flange of the axial flux machine.

16. The rotor assembly of claim 13, wherein:
the first support structure is made of at least one first material; and
the second support structure is made of at least one second material which is different than the at least one first material.

17. The rotor assembly of claim 13, wherein:
the at least one magnet comprises magnet segments; and
the second support structure is further configured to restrict radial movement of the magnet segments when the magnet segments are attached to the first support structure and the second support structure is attached to the first support structure.

18. The rotor assembly of claim 17, wherein:
the second support structure further comprises a circular lip configured to engage outermost edges of the magnet segments to restrict the radial movement of the magnet segments.

19. The rotor assembly of claim 17, wherein:
the first support structure is further configured to allow the magnet segments to slide radially when the second support structure is detached from the first support structure.

20. The rotor assembly of claim 19, wherein:
the second support structure is further configured to be detachable from the first support structure to allow the magnet segments to be removed from the first support structure by sliding in a radial direction.

21. The rotor assembly of claim 13, wherein:
the at least one magnet comprises magnet segments; and
the first support structure further comprises ribs configured to restrict angular movement of the magnet segments when the magnet segments are attached to the first support structure.

22. The rotor assembly of claim 13, wherein:
the at least one magnet comprises a ring magnet configured to be attached to the first support structure.

23. A method, comprising:
attaching at least one magnet to a first support structure of a rotor assembly for an axial flux machine such that the first support structure provides a flux return path for the at least one magnet; and
attaching a second support structure to the first support structure having the at least one magnet attached thereto so as to allow torque to be transferred between the at least one magnet and the second support structure via the first support structure, wherein the second support structure is further configured (A) to be attached to a rotatable shaft of the axial flux machine, or (B) to function as an output or input flange of the axial flux machine; wherein:
the second support structure is adapted to rotate about an axis of rotation of the axial flux machine,
the at least one magnet has a first surface that is orthogonal to a magnetization direction of the at least one magnet and faces away from the first support structure,
the first support structure, the second support structure, and the at least one magnet are configured and arranged such that, if the first support structure, the second support structure and the at least one magnet are stationary with respect to the axis of rotation and not influenced by any other magnetic components, then a distance between a first plane that intercepts a first point on the first surface and to which the axis of rotation is normal and a second plane that intercepts a second point on the first surface and to which the axis of rotation is normal is substantially greater than zero,
the second point is at a larger radial distance from the axis of rotation than the first point, and
the first support structure, the second support structure, and the at least one magnet are further configured and arranged such that, if the first support structure, the second support structure and the at least one magnet are stationary with respect to the axis of rotation and not influenced by any other magnetic components, then a ray that extends away from the first surface at the second point and is normal to the first surface intercepts the first plane.

24. The method of claim 23, wherein:
the at least one magnet has an inner edge disposed at the first point;
the at least one magnet has an outer edge that is opposite the inner edge and disposed at the second point; and
the first support structure, the second support structure and the at least one magnet are further configured and arranged such that, if the first support structure, the second support structure and the at least one magnet are stationary with respect to the axis of rotation and not influenced by any other magnetic components, then a ratio of the distance between the first and second planes and a distance between the first and second points is greater than 0.002.

25. The method of claim 23, wherein:
the first support structure is made of at least one first material; and
the second support structure is made of at least one second material which is different than the at least one first material.

26. The method of claim 23, wherein:
the at least one magnet comprises magnet segments, and
attaching the second support structure to the first support structure further comprises attaching the second support structure to the first support structure such that the second support structure restricts radial movement of the magnet segments.

27. The method of claim 26, further comprising:
detaching the second support structure from the first support structure to allow the magnet segments to be removed from the first support structure by sliding in a radial direction.

* * * * *